(12) United States Patent
Otaguro et al.

(10) Patent No.: US 8,804,265 B2
(45) Date of Patent: Aug. 12, 2014

(54) CALIBRATION OF A RESONANCE FREQUENCY FILTER

(75) Inventors: Yoshito Otaguro, Kyoto (JP); Shinichi Miura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 193 days.

(21) Appl. No.: 13/336,319

(22) Filed: Dec. 23, 2011

(65) Prior Publication Data

US 2013/0162365 A1  Jun. 27, 2013

(51) Int. Cl.
*G11B 5/02* (2006.01)
*G01H 13/00* (2006.01)

(52) U.S. Cl.
USPC .............................. 360/55; 73/579

(58) Field of Classification Search
None
See application file for complete search history.

(56) References Cited

U.S. PATENT DOCUMENTS

2008/0092675 A1  4/2008 Komine
2010/0064809 A1*  3/2010 Toga et al. ................. 73/514.34

FOREIGN PATENT DOCUMENTS

JP  2008-107324  5/2008

* cited by examiner

*Primary Examiner* — Wayne Young
*Assistant Examiner* — Brian Butcher
(74) *Attorney, Agent, or Firm* — Fish & Richardson P.C.

(57) ABSTRACT

Calibrating a frequency filter includes applying a series of input electrical signals at different frequencies to a shock sensor, using circuitry to identify a particular one of the frequencies as a resonance frequency of the shock sensor based on responses of the shock sensor to the series of input signals, and setting a center frequency of the notch filter equal to the particular frequency identified as the resonance frequency of the shock sensor.

34 Claims, 6 Drawing Sheets

CALIBRATION OF A RESONANCE FREQUENCY FILTER

BACKGROUND

Modern electronic devices can sometimes include shock protection technology to detect when a device experiences a shock and to provide protection by shutting down parts of the device when the shock occurs. In some cases, the shock protection technology utilizes an impact sensor, such as an accelerometer, that has a unique resonance frequency. The gain at the resonance frequency is often higher than the gain at other frequencies due to the increased sensitivity and can lead to erroneous and inaccurate impact detection. Furthermore, due to variations in the manufacturing process, the resonance frequency may be slightly different for different sensors. In some cases, the resonance frequency may even change over time for the same sensor.

SUMMARY

The subject matter of the present disclosure relates to calibration of a resonance frequency filter.

In general, one aspect of the subject matter described in this specification can be embodied in a method of calibrating a frequency filter, in which the method includes applying a series of input electrical signals at different frequencies to a shock sensor, using circuitry to identify a particular one of the frequencies as a resonance frequency of the shock sensor based on responses of the shock sensor to the series of input signals, and setting a center frequency of the notch filter equal to the particular frequency identified as the resonance frequency of the shock sensor.

The method can cover one or more of the following features. For example, in some implementations, using circuitry to identify the particular frequency includes, for each input electrical signal, measuring a corresponding output signal from the shock sensor, and identifying a frequency of one of the input electrical signals corresponding to a detected output signal as the resonance frequency of the shock sensor. Measuring the output signal can include measuring a voltage output of the shock sensor. Alternatively, or in addition, measuring the output signal can include measuring an amplitude of the output signal. In some implementations, measuring the output signal includes measuring the output signal at multiple different times for each input signal applied to the shock sensor.

In some implementations, identifying the frequency of one of the input signals includes identifying a detected output signal having a minimum or maximum amplitude, and determining a frequency of an input signal that results in the output signal having the minimum or maximum amplitude, when the input signal is applied to the shock sensor. The method can further include determining an absolute value of an output signal amplitude based on measurements of the output signal at multiple different times. The different times can occur over one period of the output signal. The different times can be spaced apart by the approximately same amount of time.

In some implementations, measuring the output signal includes converting the output signal from an analog signal to a digital signal.

In some implementations, applying the series of input electrical signal includes successively increasing or decreasing the input signal frequency by a first amount.

In certain implementations, applying the series of input electrical signal includes supplying a pulsed current signal to the shock sensor.

In various implementations, the notch filter and the circuitry form an apparatus, and the method is performed in response to the apparatus being turned on.

Another aspect of the subject matter described in this specification can be embodied in a resonance frequency filter calibration circuit that includes a control circuit electrically couplable to a notch filter and to a shock sensor, in which the control circuit is operable to apply a series of input electrical signals at different frequencies to the shock sensor, identify a particular one of the frequencies as a resonance frequency of the shock sensor based on responses of the shock sensor to the series of input signals, and set a center frequency of a notch filter equal to the particular frequency identified as the resonance frequency of the shock sensor.

The calibration circuit can include one or more of the following features. For example, in some implementations, the control circuit is operable to measure a corresponding output signal from the shock sensor for each input electrical signal, identify an output signal having a minimum or maximum amplitude, and determine a frequency of an input signal that results in the output signal having the minimum or maximum amplitude, when the input signal is applied to the shock sensor.

The control circuit can be operable to successively increase or decrease the applied input signal frequency by a first amount.

In some implementations, the control circuit is operable to measure the output signal from the shock sensor at a plurality of different times for each input signal applied to the shock sensor.

In certain implementations, the calibration circuit further includes an analog-to-digital converter circuit electrically coupled to the control circuit and operable to convert an analog output signal from the shock sensor to a digital output signal.

In various implementations, the input electrical signals include pulsed current signals.

In some implementations, the control circuit is operable to measure an amplitude of the output signal from the shock sensor.

In some implementations, the calibration circuit further includes the notch filter. In some implementations, the calibration circuit further includes the shock sensor.

Another aspect of the subject matter described in this specification can be embodied in a hard disk drive that includes an impact sensor, a notch filter, and a resonance frequency calibration circuit operable to calibrate the notch filter, in which calibration of the filter includes applying a series of input electrical signals at different frequencies to the impact sensor, using circuitry to identify a particular one of the frequencies as a resonance frequency of the impact sensor based on responses of the impact sensor to the series of input signals, and setting a center frequency of the notch filter equal to the particular frequency identified as the resonance frequency of the impact sensor.

The hard disk drive can include one or more of the following features. For example, in some implementations, the resonance frequency calibration circuit is operable to calibrate the notch filter when the hard disk drive is turned on.

In some implementations, the resonance frequency calibration circuit is operable to calibrate the notch filter when the hard disk drive is activated from a stand-by mode.

In various implementations, the resonance frequency calibration circuit is operable to calibrate the notch filter based on a change in at least one of temperature, pressure or humidity.

In some implementations, the resonance frequency calibration circuit is operable to calibrate the notch filter after a specified time period has elapsed.

In some implementations, the resonance frequency calibration circuit is operable to calibrate the notch filter after the hard disk drive has been activated a specified number of times.

The subject matter of the present disclosure can be used, for example, to automatically determine and calibrate variations in a shock sensor's resonance frequency. Such calibration can aid in reducing or eliminating errors that occur as a result of false shock detection.

The details of one or more implementations are set forth in the accompanying drawings and the description below. Other features and advantages will be apparent from the description, the drawings, and claims.

DETAILED DESCRIPTION

Shock protection technology utilizes impact sensors that generate an electric charge or voltage when the sensor undergoes a shock. For some impact sensors, the electric charge/voltage is proportional to the acceleration/deceleration applied to the sensor. Accordingly, if the electric charge/voltage exceeds some predetermined threshold, the sensor indicates that a shock has occurred. However, in some cases, the vibration of the impact sensor, caused by an impact or acceleration/deceleration, coincides with a resonance frequency of the sensor, where the sensor gain is exceptionally high, thus leading to erroneous detection of shocks. To compensate for increased gain that occurs at the resonance frequency, the shock sensor can be coupled to a band-stop filter (e.g., a notch filter) that attenuates the output of the shock sensor at the resonance frequency. Yet the resonance frequency of the sensor may not be known or may vary over time.

Figure 1:
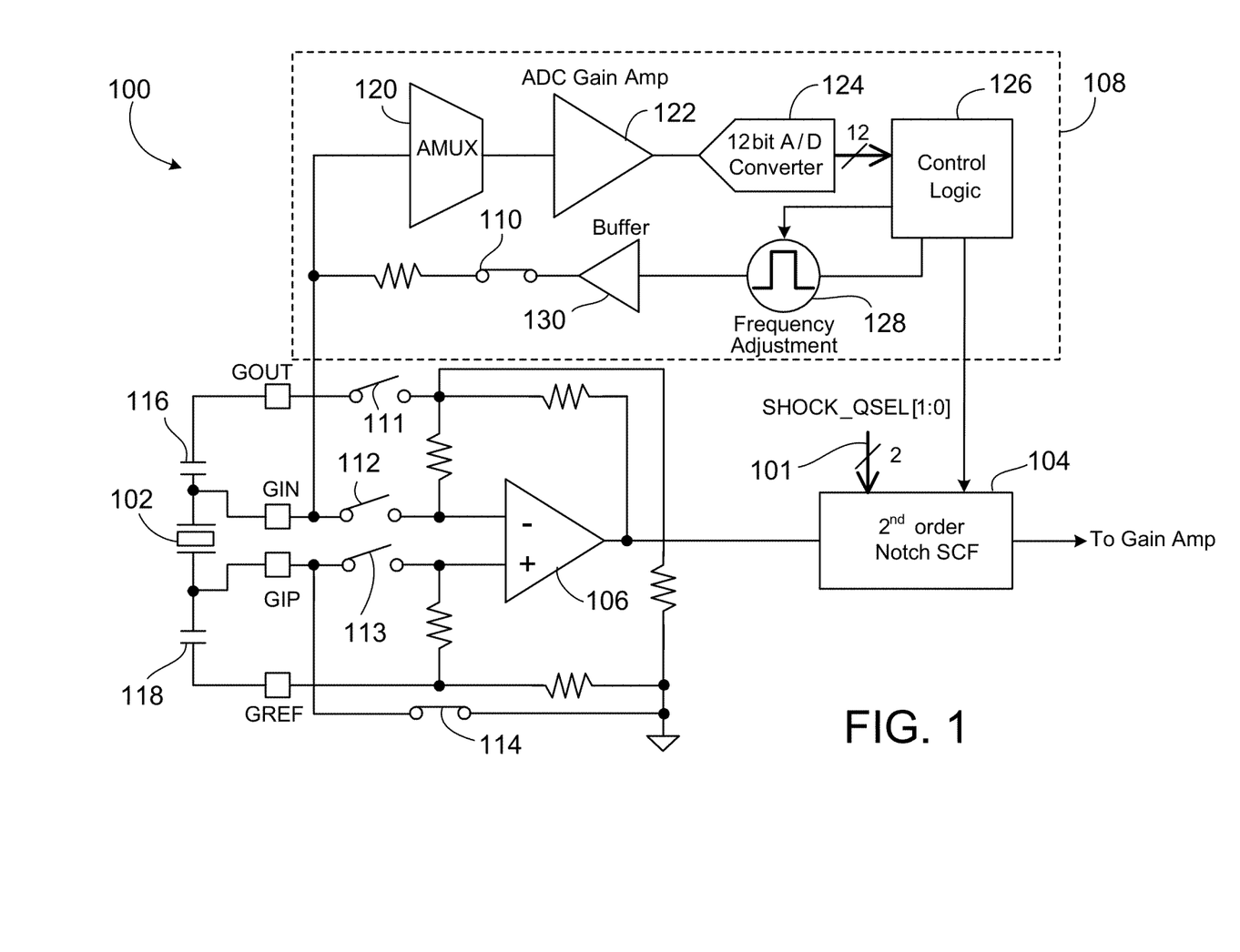
FIG. 1 is a schematic of an example resonance frequency calibration circuit.

FIG. 1 is an example of a resonance frequency calibration circuit 100 according to a first implementation, in which the circuit 100 can be used to automatically locate a resonance frequency of a shock sensor and adjust the frequency at which a band-stop filter attenuates the output of the shock sensor. The circuit 100 thus can compensate for shock sensor resonance frequency variations that occur during the sensor manufacturing process and/or that occur over the life of the sensor.

As shown in FIG. 1, calibration circuit 100 includes a shock sensor 102, a band-stop filter 104 electrically coupled to an output of the shock sensor 102 through an amplifier 106, and a control circuit 108 electrically coupled to both the band-stop filter 104 and the shock sensor 102. Circuit 100 can operate in two distinct modes: 1) calibration mode and 2) sensing mode. During calibration mode, circuit 100 determines the resonance frequency of the shock sensor and sets the operating frequency of the band-stop filter 104 equal to the identified resonance frequency. In particular, the control circuit 108 can apply a series of electrical signals at different frequencies to the shock sensor 102 and, based on the sensor response, identify which of the applied frequencies corresponds to the sensor resonance frequency. The control circuit 108 then can set a center frequency of the band-stop filter 104 equal to the identified sensor resonance frequency. During sensing mode, the shock sensor 102 detects rapid accelerations/decelerations. False shocks that would otherwise be detected at the resonance frequency during sensing mode are attenuated by the band-stop filter 104, thus reducing or eliminating the occurrence of erroneous shock detections.

The illustrated calibration circuit 100 also includes multiple switches (110, 111, 112, 113, and 114) and capacitors (116, 118). Switches (110-114) are set to an ON or OFF state depending on whether the calibration circuit 100 is operating in calibration mode or in sensing mode. Switch 112 is coupled to a first side of the shock sensor 102 and, when closed, also is coupled to a negative input of amplifier 106. Switch 113 is coupled to a second, opposite side of sensor 102 and, when closed, also is coupled to a positive input of amplifier 106. Switch 110 is coupled to the first side of sensor 102 and is part of control circuit 108. Switch 114 is coupled to the second side of sensor 102 and also is coupled to ground. Switch 111 is coupled to capacitor 116 and to an output of amplifier 106 through a resistor. The resistors in calibration circuit 100 have predetermined resistance values and are in addition to the inherent resistance included in wiring connections between circuit components. During calibration mode, switches 110 and 114 are ON (i.e., closed), whereas switches 111-113 are OFF (i.e., open). In contrast, when circuit 100 is in sensing mode, switches 111-113 are ON (i.e., closed) and switches 110 and 114 are OFF (i.e., open).

The shock sensor 102 can include any appropriate shock sensor that generates an electric charge/voltage in response to a shock directly or indirectly experienced by the sensor 102. A shock is not limited to an actual physical impact but also can include rapid accelerations or decelerations experienced by the sensor. Shock sensors that can be used in the circuit 100 include sensors that convert mechanical motion into an electrical signal including, for example, piezoelectric-based accelerometers, piezoresistive-based accelerometers, capacitive-based accelerometers, and micro electro-mechanical systems (MEMS) accelerometers. As explained above, a resonance frequency can be associated with the shock sensor 102, in which the gain of the sensor 102 at the resonance frequency is substantially higher than the sensor gain at other frequencies. For example, in some implementations, piezoelectric shock sensors exhibit a significant reduction in resistance at a resonance frequency. Accordingly, when an AC voltage having a constant maximum voltage amplitude is applied to such a sensor over a range of frequencies that includes the sensor resonance frequency, the current passing through the sensor will be substantially larger at (or near) the sensor resonance frequency than at other non-resonance frequencies. Conversely, if an AC current with a constant maximum value is applied to the sensor, the voltage will be substantially smaller at the sensor resonance frequency than at other frequencies due to the decrease in the sensor resistance.

The band-stop filter 104 can include any appropriate filter that attenuates the magnitude of an input signal over a specified frequency range. In some implementations, the filter 104 can include a narrow band-stop filter known as a notch filter. A notch filter is a band-stop filter that passes input signals at most frequencies unaltered, but attenuates signals that fall within in a narrow range to very low levels (e.g., a filter with a high quality factor over a narrow range). The bandwidth of a notch filter can include, for example, from 21.0 kHz to 52.5 kHz. The notch filter can include an analog filter composed, for example, of resistors, capacitors, and inductors. The filter can be, for example, a first order filter, a second order filter, or a third order filter, although other filter orders also are possible. The quality factor of the filter frequency response can be set using a main processor circuit external to the calibration circuit 100, such as, for example, a motor controller integrated circuit (IC) in a hard disk drive.

In a particular example, the signal 101 (SHOCK_QSEL, see FIG. 1) is provided to the band-stop filter 104 to configure the filter quality factor. Examples of quality factor values for the filter 104 include about 0.3, about 0.5, about 0.1, or about 1.0. In some implementations, the notch filter can include a digital notch filter instead of an analog filter, in which the digital filter is incorporated within a separate integrated chip.

The control circuit 108 includes an analog multiplexer (AMUX) 120, an analog-to-digital converter (ADC) gain amplifier 122, an ADC 124, a control logic processor 126, a pulse generator 128, a buffer 130 and switch 110. One of several inputs to AMUX 120 is electrically coupled to the first side of shock sensor 102. The remaining inputs to AMUX 120 are omitted here for clarity.

During calibration mode, AMUX 120 selects, as an input signal, the output of shock sensor 102. The analog shock sensor output signal is passed from AMUX 120 to the ADC gain amplifier 122, where the signal is amplified and then provided to the ADC 124. At the ADC 124, the analog signal is converted to a digital signal. In the present example, the resolution of the ADC 124 is 12-bits, though lower or higher resolution ADCs can be used as well.

In calibration mode, the digital signal from ADC 124 then is passed to the control logic processor 126. The control logic processor 126 can perform several operations during the calibration mode of circuit 100. A first operation includes adjusting the frequency of a pulse generator 128. For instance, control logic processor 126 can supply a command to pulse generator 128 such that pulse generator 128 sequentially increases the frequency of an output signal. As an example, control logic processor 126 can send a command to pulse generator 128 to increase the frequency of a pulse train by a specified amount (e.g., about 10 Hz, about 50 Hz, about 100 Hz, about 250 Hz, about 500 Hz, about 1 kHz, about 5 kHz, about 10 kHz, or about 50 kHz). Pulse generator 128 can include any suitable pulse generating circuit including, for example, a crystal oscillator or piezoresistive ceramics. The pulse train output by pulse generator 128 can include a voltage or current signal that is supplied to buffer 130, in which the buffer acts as an impedance converter. The pulse train can include, for example, a square-wave, sawtooth wave, triangle wave, or sine wave.

From buffer 130, the pulse train then is applied to the shock sensor 102. The application of the pulse train signal (having a particular frequency) to shock sensor 102 thus emulates a shock/vibration of the same frequency being applied to the sensor 102. In response to the application of the pulse train, shock sensor 102 can generate an output signal that is coupled to AMUX 120.

Based on the signal received from ADC 124, processor 126 also can specify a resonance frequency at which the band-stop filter 104 operates. That is, processor 126 can provide to band-stop filter 104 the frequency at which output signals from shock sensor 102 are to be substantially attenuated. In some implementations, the processor 126 specifies a range of frequencies, as opposed to a single frequency, over which band-stop filter 104 is to operate. In some implementations, processor 126 includes one or more memory devices in which the processor 126 can store data including, for example, the current frequency being applied to the pulse generator 128 as well as the resonance frequency of the sensor 102.

As noted above, switch 110 is OFF during sensing mode, such that the pulse train is not supplied to shock sensor. In contrast, switches 111-113 are ON during sensing mode so that a charge across shock sensor 102 is supplied to charge amplifier 106. The output of charge amplifier 106 then is supplied to the band-stop filter 104 which serves to attenuate the output at a frequency previously set by control circuit 108 during the calibration mode.

It should be noted that, during the sensing mode of circuit 100, the output measured at $G_{OUT}$ (at capacitor 116) is a steady-state DC voltage when no shock is applied. However, when a shock is applied to sensor 102 (or indirectly applied to a circuit device in which sensor 102 is operating), the output voltage measured at Gout begins to oscillate as an AC voltage. Similarly, the outputs measured at $G_{IN}$ and $G_{IP}$ are DC voltages in the absence of a shock being applied to sensor 102, but are AC voltages when sensor 102 undergoes rapid acceleration/deceleration.

Figure 2A:
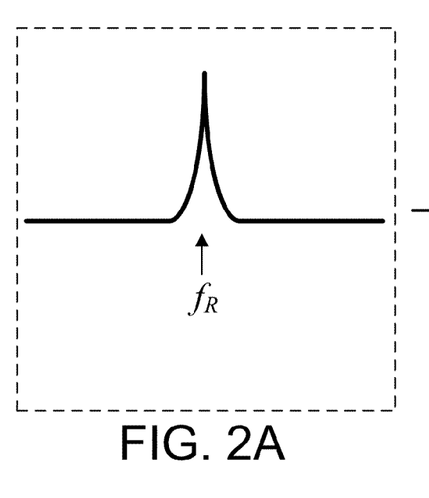
FIG. 2A is a frequency characteristic diagram of an example signal produced by a shock sensor.
Figure 2B:
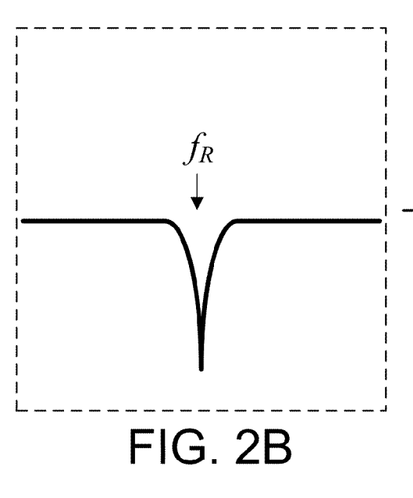
FIG. 2B is a frequency characteristic diagram of an example filter response for a notch filter.
Figure 2C:
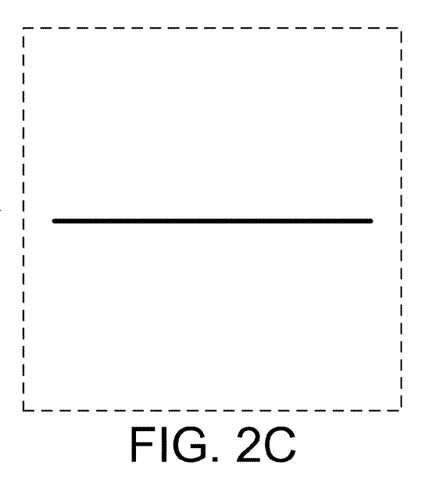
FIG. 2C is a frequency characteristic diagram of an example output from the notch filter of FIG. 2B when the example signal of FIG. 2A is applied to the notch filter.

FIG. 2A is a plot of an example signal produced by a shock sensor, in which the signal includes a false peak occurring at the sensor resonance frequency, $f_R$. As is evident from the figure, the false peak occurring at the resonance frequency has a magnitude substantially larger than the surrounding output signal from the shock sensor. FIG. 2B is a plot of an example filter response curve for a notch filter, in which the operating frequency of the notch filter (i.e., the frequency at which the filter is operable to attenuate an incoming signal) is set equal to the resonance frequency $f_R$. Thus, when the shock sensor output signal shown in FIG. 2A is applied to a band-stop filter having the frequency response curve shown in FIG. 2B, the signal peak should be attenuated such that the peak is substantially removed, e.g., such as shown in the frequency response curve of FIG. 2C.

Figure 3:
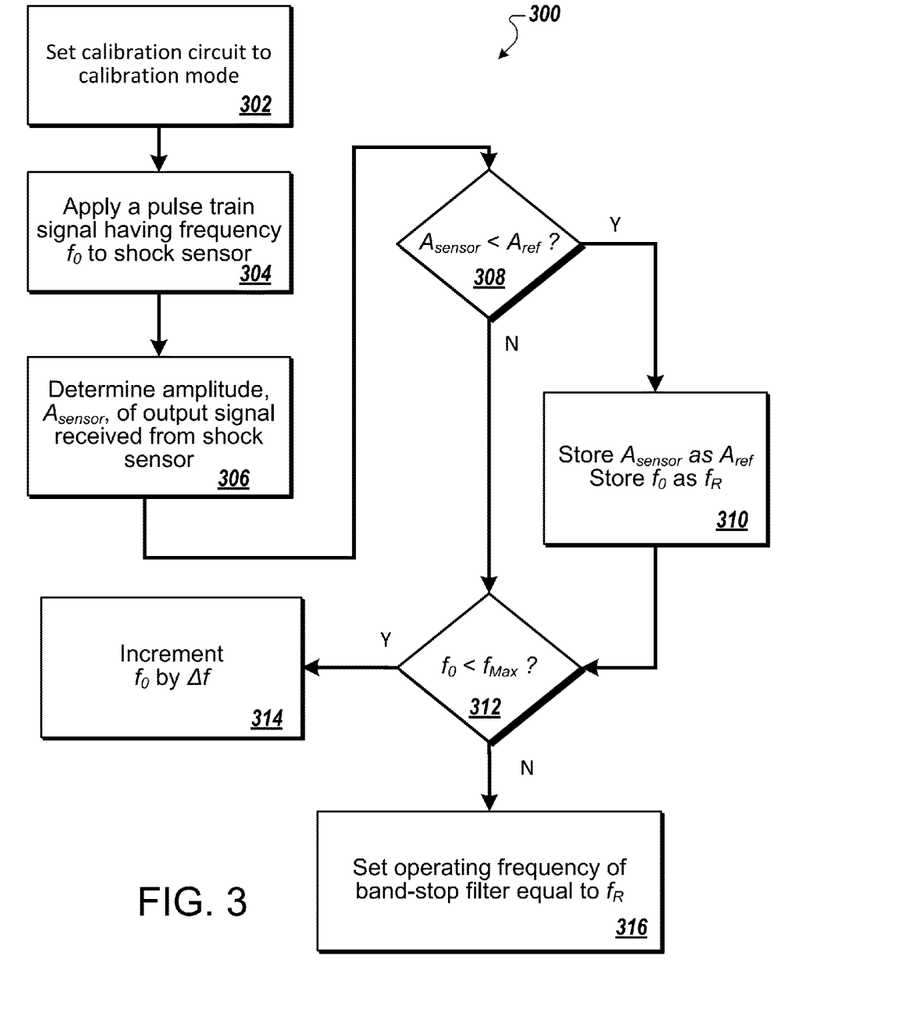
FIG. 3 is a flow chart of an example process for calibrating a shock sensor filter.

FIG. 3 is a flow chart of an example process 300 for calibrating a shock sensor filter, in which the process can be performed, for example, by the calibration circuit 100 shown by FIG. 1. To begin the calibration process, the circuit 100 is set (302) to calibration mode. Setting circuit 100 to calibration mode can include turning switches 110 and 114 to an ON-state and turning switches 111-113 to an OFF-state. With switches 110 and 114 closed, a pulse train (to be produced by pulse generator 128 during calibration) can be supplied to shock sensor 102. In addition, with switches 111-113 open, the output from shock sensor 102 is prevented from reaching amplifier 106 or band-stop filter 104. Command signals supplied to the switches 110-114 are supplied by a main processor circuit external to the calibration circuit 100, such as, for example, a motor controller integrated circuit (IC) in a hard disk drive.

Setting circuit 100 in calibration mode also can include setting a clock frequency of the pulse generator 128. In particular, upon entering calibration mode, control logic processor 126 sends a signal to pulse generator 128 indicating an initial frequency $f_0$ at which the pulse generator 128 generates a pulse train. The value of initial frequency $f_0$ can be specified in a program that is stored in memory and that is executed by processor 126. In some implementations, the value of frequency $f_0$ is set to a predetermined value. For example, the control logic processor 126 can set the initial frequency of the pulse generator 128 to about 5 kHz, about 10 kHz, about 15 kHz, about 20 kHz, about 25 kHz, about 30 kHz or about 35 kHz. Other initial frequencies can be used as well.

Setting circuit 100 in calibration mode also can include configuring AMUX 120 to pass an output signal from shock sensor 102 to the ADC gain amplifier 122. For instance, AMUX 120 can include multiple different inputs, in which each input is coupled to a different part of an integrated chip. Depending on its configuration, AMUX 120 can select one of the inputs and forward the selected input into a single output line. In the present example, the single output line is coupled to ADC gain amplifier 122. Accordingly, when a calibration mode signal is sent from the main processor circuit to AMUX 120, AMUX 120 selects the output of shock sensor 102 (i.e., $G_{IN}$ shown in FIG. 1) and forwards the shock sensor output to ADC gain amplifier 122 over a single output line.

In some implementations, setting circuit 100 to calibration mode also includes setting a gain of the ADC gain amplifier 122. For example, ADC gain amplifier 122 can be set to apply a gain of 5, 10, 20, 50 or 100 to a signal the amplifier 122 receives as an input. The amplifier 12 can be configured to apply other gain as well. The control signal for setting the amplifier gain can be generated by the main processor circuit.

In some implementations, the quality factor of the band-stop filter 104 is set during calibration mode. For example, the signal SHOCK_QSEL (see FIG. 1) sent by the main processor circuit can be provided to filter 104 to set the filter quality factor. Alternatively, the quality factor can be set during sensing mode of calibration circuit 100.

Once the calibration circuit 100 is set in calibration mode, the pulse generator 128 applies (304) a pulse train signal having a frequency $f_0$ to shock sensor 102. As explained above, a pulse train signal includes a voltage or current signal that has a repeating pattern, where the pattern can correspond to, for example, a square wave, a sawtooth wave, a triangle wave, or a sinusoidal wave. In some implementations, the control logic processor 126 also sets a pulse train length. That is, the processor 126 sets how long each pulse train produced by pulse generator 128 lasts. For example, processor 126 can set each pulse train to be 500 μs, 1 ms, 2 ms, 5 ms or 10 ms long, although other pulse train lengths also are possible. Thus, for a pulse train 2 ms long and operating at a frequency of 20 kHz (i.e., a period of 1/20 ms), 400 pulses can be issued by pulse generator 128. The pulse train signal is passed from pulse generator 128 to a buffer device 130 and then to shock sensor 102.

The application of the pulse train signal to sensor 102 emulates a shock of the same frequency. In response to receiving the pulse train signal, shock sensor 102 thus generates an electric charge proportional to each input pulse of the pulse train. Because AMUX 120 is tied to sensor 120, the electric charge then is passed as an output signal to AMUX 120 and ultimately to control logic processor 126.

Figure 4:
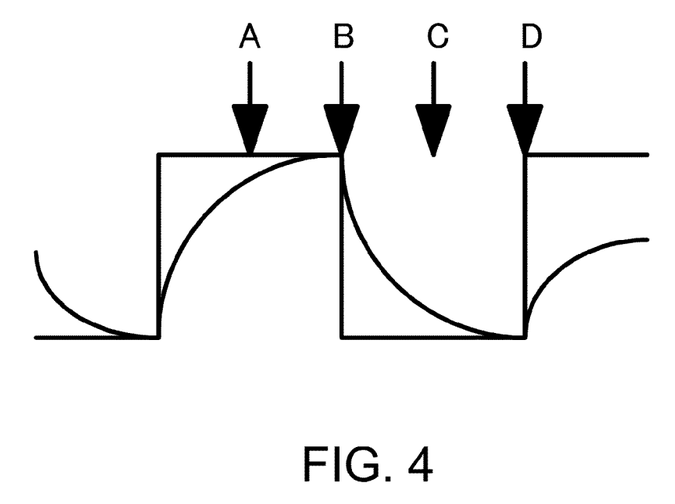
FIG. 4 is a plot of an example output voltage signal versus time obtained from a piezoelectric shock sensor.
Figure 5A:
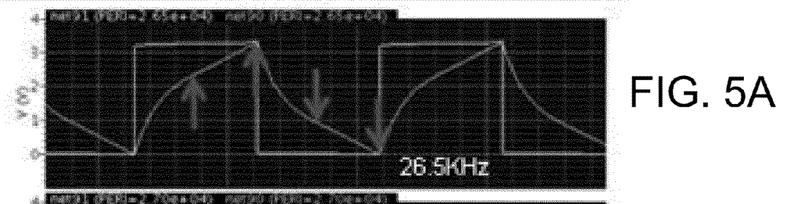
FIGS. 5A-5F are plots of shock sensor output signals obtained using a calibration circuit.
Figure 5B:
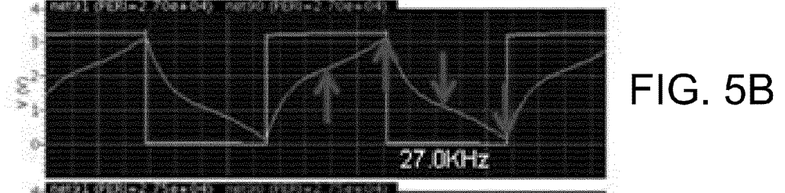
Figure 5C:
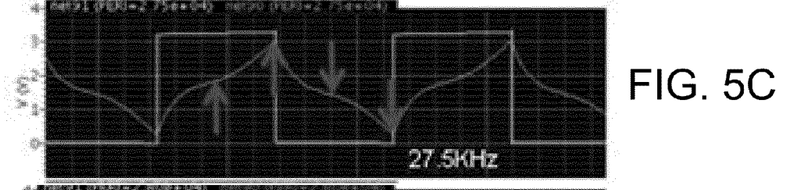
Figure 5D:
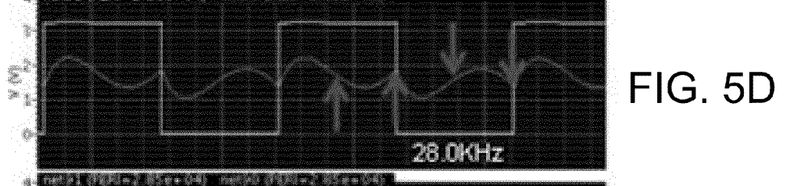
Figure 5E:
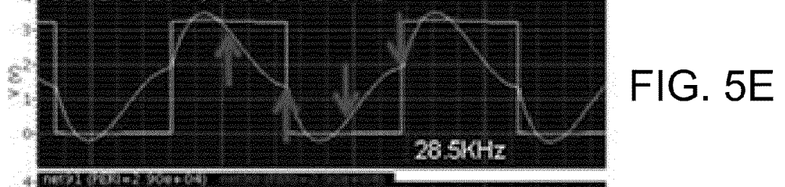
Figure 5F:
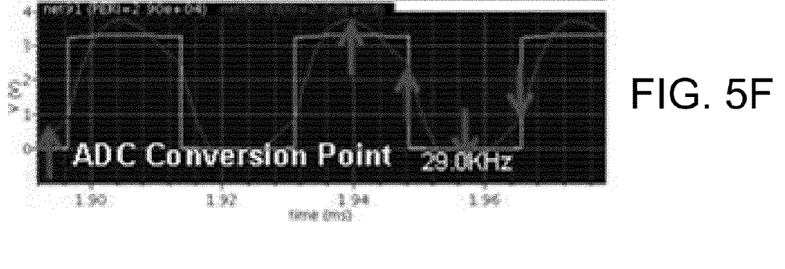

Subsequently, control logic processor 126 determines (306) an amplitude, $A_{sensor}$, of the output signal received from shock sensor 102. Various methods can be used to determine the amplitude of the shock sensor output signal. For instance, in some implementations, the control logic processor measures the magnitude of the shock sensor output signal at multiple different times and calculates, based on the measurements, the output signal amplitude. FIG. 4 is a plot illustrating the foregoing amplitude measurement. In particular, FIG. 4 shows a plot of an example output voltage signal 400 versus time obtained from a piezoelectric shock sensor. An example input pulse train signal 410 is overlaid against the output signal 400 for comparison. The control logic processor measures the magnitude/intensity of the output signal 400 at four different points in time: a first point A, a second point B, a third point C, and a fourth point D. Using these measurements, the control logic processor 126 calculates the output signal amplitude. For example, the control logic processor 126 can calculate the output signal amplitude based on an average of the multiple signal measurements. That is, the amplitude can be calculated as the difference between the average of A and B and the average of C and D, i.e., $A_{sensor}=(V_A+V_B)/2-(V_C+V_D)/2$, where V represents the output voltage of sensor 102 measured at time A, B, C or D. Although only four measurements are used in the foregoing calculation, additional measurements (e.g., 10, 50, or 100 measurements) may be used to improve the reliability and accuracy of the amplitude calculation. In some implementations, two measurements of the output signal are sufficient to determine the output amplitude. However, in some implementations, fewer measurements of the output signal can lead to less reliable amplitude calculations. In some implementations, the control logic processor 126 calculates the output signal amplitude based on integration of the output signal. For example, the control logic processor 126 can integrate the output signal from the shock sensor over a single period to determine the output signal amplitude.

Referring back to FIG. 3, once the amplitude of the shock sensor output signal has been calculated, the amplitude is compared (308) against a reference amplitude value, $A_{ref}$. The reference amplitude value can be set initially to a predetermined value prior to first operation of circuit 100. If the output signal amplitude meets the criteria specified by the comparison (308), the output signal amplitude then is stored (310) as the new reference amplitude value $A_{ref}$ and the frequency of the previously applied pulse train signal is identified and stored as the shock sensor resonance frequency $f_R$. For example, in some implementations, the comparison (308) includes determining whether the shock sensor output amplitude $A_{sensor}$ is less than the reference value $A_{ref}$. If the output amplitude is less, the result of the comparison can be an indication that the resistance of the shock sensor has decreased (e.g., as in piezoresistive shock sensors). The decrease in resistance of the shock sensor thus indicates that the frequency of the applied pulse train signal is close or equal to the resonance frequency of the shock sensor.

Whether or not the output signal meets the criteria specified in the comparison (308), the frequency of the previously applied pulse train signal (i.e., $f_0$) is compared (312) against a maximum frequency $f_{max}$. The maximum frequency $f_{max}$ can be stored in memory and can be set to a predetermined value prior to operating the calibration circuit 100. If $f_0$ is less than $f_{max}$ (or if $f_0$ is greater than $f_{max}$), the calibration procedure is not yet complete and the control logic processor 126 then increments (or decrements) (314) the frequency $f_0$ of the pulse generator 128 by an amount $\Delta f$. For example, the control logic processor 126 can increment (or decrement) the frequency $f_0$ by 10 Hz, 50 Hz, 100 Hz, 500 Hz or 1 kHz. The processor 126 can increment (or decrement) the pulse train signal frequency by other amounts as well. The calibration process described in procedures (304), (306), (308), (310) and (312) is repeated. That is, a new pulse train signal having the new pulse frequency is applied to the shock sensor, which generates an electric charge in response. As before, the amplitude of the electric charge generated by the shock sensor 102 is calculated by control logic processor 126 and compared against the previously stored amplitude value. Depending on the comparison, the stored amplitude value can be replaced with the amplitude of the most recent measurement.

When it is determined in (312) that the maximum frequency has been reached, the operating frequency of the band-stop filter 104 is set (316) equal to the most recently stored resonance frequency $f_R$. For example, if the band-stop filter 104 is a notch filter, the control logic processor 126 generates and sends a command to the notch filter, configuring the filter such that it is operable to attenuate incoming signals at the resonance frequency $f_R$. The calibration procedure then ends.

Once the calibration procedure has ended, the circuit 100 can switch to the sensing mode. In sensing mode, switches 111-113 are closed and switches 110, 114 are opened. As a result, the output from sensor 102 is coupled to amplifier 106, the output of which, in turn, is coupled to band-stop filter 104. Accordingly, when a false peak occurs in the output of sensor 102 at the sensor resonance frequency, the false peak is attenuated by band-stop filter 104 during the sensing mode of circuit 100.

FIGS. 5A-5F are plots of shock sensor output signals obtained experimentally during a calibration procedure using circuit 100. Each sensor output signal in the plots is overlaid against an input pulse train voltage signal applied to the shock sensor 102. The frequency of the input pulse train signal is successively increased by control logic processor 126 from 26.5 kHz in FIG. 5A to 29.0 kHz in FIG. 5F in 500 Hz increments. As can be seen in the graphs, the sensor output signal generally follows the trough to peak values of the input pulse train. However, the sensor output signal tends to exhibit a distorted version of the input pulse train. This distortion is due to the variation in resistance of the shock sensor as the resonance frequency is approached. In particular, the closer the frequency of the input pulse train is to the resonance frequency of the shock sensor, the more the shock sensor output signal becomes distorted. A high level of distortion of the output signal is reached at the resonance frequency of the shock sensor (see, e.g., FIG. 5D). In addition, the amplitude of the shock sensor output signal (measured as the difference between the maximum magnitude and minimum magnitude of the output signal) reaches a minimum value at the resonance frequency. When the frequency of the input signal subsequently moves away from the resonance frequency, the distortion of the shock sensor output signal is reduced (see, e.g., FIGS. 5E-5F).

The calibration circuits in this disclosure can be employed in various electronic devices that utilize shock sensors. For example, in some implementations, the calibration circuit(s) can be used in conjunction with a shock sensor in a hard-disk drive (HDD). Incorporating a shock sensor into a HDD helps protect the HDD against damage that may occur if the device containing the HDD is dropped or hit with a substantial force, either during normal use or at any point after the device manufacturing. For example, when a shock is detected by the shock sensor, a command is issued to place the HDD in a standby or "non-operating" mode so that damage to the HDD can be minimized. For such devices, the calibration circuit can be used to reduce or eliminate the occurrence of false shocks that would otherwise place the device in a standby mode.

When incorporated into an electronic device, the calibration circuit can be operated at various times. For example, the calibration circuit can perform a calibration of a resonance frequency filter when the electronic device is turned on for the first time, e.g., prior to shipping. In some implementations, calibration can be performed the first time the electronic device is activated by a customer (e.g., an end user or a retailer). In some instances, calibration of the resonance frequency filter is performed each time the electronic device is turned on. Calibration can be performed when the electronic device is activated from a standby mode. In some implementations, calibration is performed after the electronic device is activated from an off-state or from standby mode a predetermined number of times. In some implementations calibration of a resonance frequency filter is performed at predetermined time periods or according to a schedule including, for example, every few hours or every week. In some implementations, calibration is performed in response to environmental changes including, for example, changes in temperature, changes in pressure, or changes in humidity. Additionally, the calibration circuits can be configured to perform calibration of a band-stop filter for a shock sensor according to any combination of the above implementations.

Figure 6:
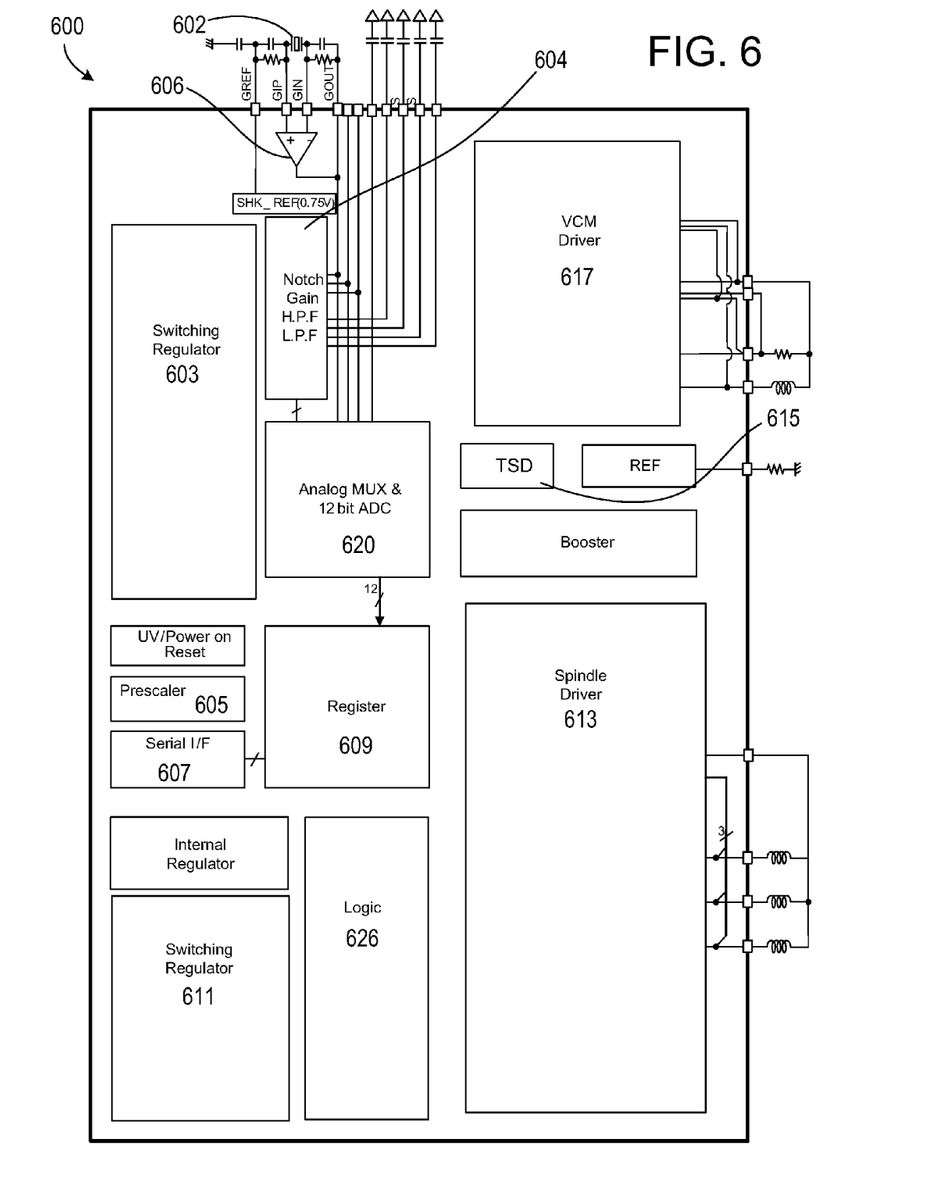
FIG. 6 is a circuit schematic of an example integrated chip.

FIG. 6 is a circuit schematic of an example integrated chip (IC) 600 for an electronic device such as a hard disk drive, in which the IC 600 includes a resonance frequency calibration circuit. The IC 600 is operable to control an arm on which a magnetic head of the hard disk drive is mounted. The IC 600 also is operable to generate commands for protecting the electronic device operation in response to detection of a shock or fall, such as providing an instruction to retract a spindle arm of the HDD. For example, the IC 600 can issue one or more commands to cease operation of the arm upon detection of a jolt or rapid acceleration of the electronic device. IC 600 includes several components for operating the arm including, for example, one or more switching regulators (603, 611), a prescaler 605 to reduce a frequency of a system clock pulse so that the clock pulse can be used by the calibration circuit, a serial interface 607, and a register 609. IC 600 also can include multiple components that make up a magnetic disk spindle driver 613, and a thermal shutdown (TSD) circuit 615, and one or more components that make up a voice coil motor (VCM) 617 to drive the arm of the magnetic head.

The calibration circuit included in IC 600 is composed of a control logic processor 626, a charge amplifier 606, an AMUX/ADC circuit 620, shock sensor 602, and a band-stop filter 604. It should be noted that control logic processor 626 is operable to issue commands to components of the calibration circuit as well as other components outside of calibration circuit on IC 600. Similar to the calibration circuits described with reference to FIG. 1, the calibration circuit of IC 600 can apply pulse train signals having successively increasing or decreasing frequencies to the shock sensor 602 and can measure the output of the shock sensor 602 in response to the applied pulse train signals to determine the sensor resonance frequency. When the resonance frequency of the sensor is identified, the calibration circuit can set the frequency at which the band-stop filter 604 is configured to attenuate an input signal equal to the identified resonance frequency.

A number of implementations have been described. Nevertheless, it will be understood that various modifications may be made without departing from the spirit and scope of the invention. Other implementations are within the scope of the following claims.

What is claimed is:

1. A method of calibrating a frequency filter, the method comprising:
   applying a series of input electrical signals at different frequencies to a shock sensor;
   using control circuitry to identify a particular one of the frequencies as a resonance frequency of the shock sensor based on responses of the shock sensor to the series of input signals, wherein using the control circuitry to identify the particular frequency comprises amplifying an output of the shock sensor with an amplifier that operates only during a calibration mode of the frequency filter; and setting a center frequency of a notch filter equal to the particular frequency identified as the resonance frequency of the shock sensor.

2. The method of claim 1, wherein using circuitry to identify the particular frequency comprises:

for each input electrical signal, measuring a corresponding output signal from the shock sensor; and identifying a frequency of one of the input electrical signals corresponding to a measured output signal as the resonance frequency of the shock sensor.

3. The method of claim 2, wherein measuring the output signal comprises measuring a voltage output of the shock sensor.

4. The method of claim 2, wherein measuring the output signal comprises measuring an amplitude of the output signal.

5. The method of claim 2, wherein measuring the output signal comprises measuring the output signal at a plurality of different times for each input signal applied to the shock sensor.

6. The method of claim 5, wherein identifying the frequency of one of the input signals comprises:

identifying a measured output signal having a minimum or maximum amplitude; and determining a frequency of an input signal that results in the output signal having the minimum or maximum amplitude, when the input signal is applied to the shock sensor.

7. The method of claim 6, wherein measuring the output signal comprises determining an absolute value of the output signal amplitude at the plurality of different times.

8. The method of claim 6, wherein the plurality of different times occur over one period of the output signal.

9. The method of claim 6, wherein the different times are spaced apart by the approximately same amount of time.

10. The method of claim 2, wherein measuring the output signal comprises converting the output signal from an analog signal to a digital signal.

11. The method of claim 1, wherein applying the series of input electrical signal comprises successively increasing or decreasing the input signal frequency by a first amount.

12. The method of claim 1, wherein applying the series of input electrical signal comprises supplying a pulsed current signal to the shock sensor.

13. The method of claim 1, wherein the notch filter and the circuitry form an apparatus, and the method is performed in response to the apparatus being turned on.

14. A resonance frequency filter calibration circuit comprising:

a control circuit electrically couplable to a notch filter and to a shock sensor, wherein the control circuit comprises an amplifier and is operable to:

apply a series of input electrical signals at different frequencies to the shock sensor;

identify a particular one of the frequencies as a resonance frequency of the shock sensor based on responses of the shock sensor to the series of input signals; and set a center frequency of a notch filter equal to the particular frequency identified as the resonance frequency of the shock sensor, wherein the amplifier is operable to amplify an output of the shock sensor only during a calibration mode of a frequency filer.

15. The resonance frequency filter calibration circuit of claim 14, wherein the control circuit is operable to:

measure a corresponding output signal from the shock sensor for each input electrical signal;

identify a measured output signal having a minimum or maximum amplitude; and determine a frequency of an input signal that results in the measured output signal having the minimum or maximum amplitude, when the input signal is applied to the shock sensor.

16. The resonance frequency filter calibration circuit of claim 15, wherein the control circuit is operable to successively increase or decrease the applied input signal frequency by a first amount.

17. The resonance frequency filter calibration circuit of claim 14, wherein the control circuit is operable to measure the output signal from the shock sensor at a plurality of different times for each input signal applied to the shock sensor.

18. The resonance frequency calibration circuit of claim 14, further comprising an analog-to-digital converter circuit electrically coupled to the control circuit and operable to convert an analog output signal from the shock sensor to a digital output signal.

19. The resonance frequency filter calibration circuit of claim 14, wherein the input electrical signals comprise pulsed current signals.

20. The resonance frequency filter calibration circuit of claim 14, wherein the control circuit is operable to measure an amplitude of the output signal from the shock sensor.

21. The resonance frequency filter calibration circuit of claim 14, further comprising the notch filter.

22. The resonance frequency filter calibration circuit of claim 14, further comprising the shock sensor.

23. A hard disk drive comprising:

an impact sensor;

a notch filter; and a resonance frequency calibration circuit comprising an amplifier, wherein the calibration circuit is operable to calibrate the notch filter by:

applying a series of input electrical signals at different frequencies to the impact sensor;

using circuitry to identify a particular one of the frequencies as a resonance frequency of the impact sensor based on responses of the impact sensor to the series of input signals; and setting a center frequency of a notch filter equal to the particular frequency identified as the resonance frequency of the impact sensor; and wherein the amplifier is operable to amplify an output of the impact sensor only during calibration of the notch filter.

24. The hard disk drive of claim 23, wherein the resonance frequency calibration circuit is operable to calibrate the notch filter when the hard disk drive is turned on.

25. The hard disk drive of claim 23, wherein the resonance frequency calibration circuit is operable to calibrate the notch filter when the hard disk drive is activated from a stand-by mode.

26. The hard disk drive of claim 23, wherein the resonance frequency calibration circuit is operable to calibrate the notch filter based on a change in at least one of temperature, pressure or humidity.

27. The hard disk drive of claim 23, wherein the resonance frequency calibration circuit is operable to calibrate the notch filter after a specified time period has elapsed.

28. The hard disk drive of claim 23, wherein the resonance frequency calibration circuit is operable to calibrate the notch filter after the hard disk drive has been activated a specified number of times.

29. A method of calibrating a frequency filter, the method comprising:
applying a series of input electrical signals at different frequencies to a shock sensor;
using circuitry to identify a particular one of the frequencies as a resonance frequency of the shock sensor based on responses of the shock sensor to the series of input signals; and
setting a center frequency of a notch filter equal to the particular frequency identified as the resonance frequency of the shock sensor,
wherein, for each input electrical signal, using the circuitry comprises: averaging an amplitude of a corresponding output signal from the shock sensor to obtain an averaged amplitude; comparing the averaged amplitude to a reference amplitude to determine whether a measurement criteria is achieved; when the measurement criteria is achieved, setting a new reference amplitude equal to the averaged amplitude and setting a new resonant frequency equal to the frequency of the input signal; and when the measurement criteria is not achieved, maintaining the reference amplitude and the resonant frequency equal to a previously defined reference amplitude and resonant frequency, respectively.

30. A resonant frequency filter calibration circuit comprising:
a control circuit electrically couplable to a notch filter and to a shock sensor, wherein the control circuit is operable to:
apply a series of input electrical signals at different frequencies to the shock sensor;
identify a particular one of the frequencies as a resonance frequency of the shock sensor based on responses of the shock sensor to the series of input signals; and
set a center frequency of a notch filter equal to the particular frequency identified as the resonance frequency of the shock sensor, and wherein, for each input electrical signal, the control circuit is operable to:
average an amplitude of a corresponding output signal from the shock sensor to obtain an averaged amplitude;
compare the averaged amplitude to a reference amplitude to determine whether a measurement criteria is achieved;
when the measurement criteria is achieved, set a new reference amplitude equal to the averaged amplitude and set a new resonance frequency equal to the frequency of the input signal; and
when the measurement criteria is not achieved, maintain the reference amplitude and the resonant frequency equal to a previously defined reference amplitude and resonant frequency, respectively.

31. A hard disk drive comprising:
an impact sensor;
a notch filter; and
a resonance frequency calibration circuit operable to calibrate the notch filter, wherein calibration of the filter comprises:
applying a series of input electrical signals at different frequencies to the impact sensor;
using circuitry to identify a particular one of the frequencies as a resonance frequency of the impact sensor based on responses of the impact sensor to the series of input signals; and
setting a center frequency of a notch filter equal to the particular frequency identified as the resonance frequency of the impact sensor, wherein, for each input electrical signal applied to the impact sensor, the resonance frequency calibration circuit is further operable to perform operations comprising:
averaging an amplitude of a corresponding output signal from the impact sensor to obtain an averaged amplitude;
comparing the averaged amplitude to a reference amplitude to determine whether a measurement criteria is achieved;
when the measurement criteria is achieved, setting a new reference amplitude equal to the averaged amplitude and setting a new resonance frequency equal to the frequency of the input signal; and
when the measurement criteria is not achieved, maintaining the reference amplitude and the resonant frequency equal to a previously defined reference amplitude and resonant frequency, respectively.

32. A method of calibrating a frequency filter, the method comprising:
applying a series of input electrical signals at different frequencies to a shock sensor;
identifying a particular one of the frequencies as a resonance frequency of the shock sensor based on responses of the shock sensor to the series of input signals,
wherein identifying the particular frequency comprises using an amplifier that operates only during a calibration mode of the frequency filter to amplify an output signal of the shock sensor, measuring a corresponding absolute value of the amplified output signal from the shock sensor at a plurality of different times for each input signal applied to the shock sensor, identifying a measured output signal having a minimum or maximum amplitude, and identifying a frequency of an input electrical signal that results in the output signal having the minimum or maximum amplitude as the resonance frequency of the shock sensor; and
setting a center frequency of a notch filter equal to the particular frequency identified as the resonance frequency of the shock sensor.

33. The method of claim 32, wherein the plurality of different times occur over one period of the output signal.

34. The method of claim 32, wherein the different times are spaced apart by approximately the same amount of time.

* * * * *